No. 733,038. PATENTED JULY 7, 1903.
J. G. HENDRICKSON.
LABELING MACHINE.
APPLICATION FILED DEC. 24, 1901.
NO MODEL. 6 SHEETS—SHEET 2.

Fig. 2

Witnesses:
Alexander Mitchell

Inventor
James G. Hendrickson
By
Frederick S Duncan Atty

No. 733,038. PATENTED JULY 7, 1903.
J. G. HENDRICKSON.
LABELING MACHINE.
APPLICATION FILED DEC. 24, 1901.
NO MODEL. 6 SHEETS—SHEET 3.

Fig.3

Witnesses:
Alexander Mitchell
James M Barlow

Inventor
James G. Hendrickson
By
Frederick S Duncan Atty

No. 733,038. PATENTED JULY 7, 1903.
J. G. HENDRICKSON.
LABELING MACHINE.
APPLICATION FILED DEC. 24, 1901.
NO MODEL. 6 SHEETS—SHEET 4.

Witnesses:
Alexander Mitchell
James M. Cados

James G. Hendrickson, Inventor
By Frederick S. Duncan, Atty

No. 733,038. PATENTED JULY 7, 1903.
J. G. HENDRICKSON.
LABELING MACHINE.
APPLICATION FILED DEC. 24, 1901.
NO MODEL. 6 SHEETS—SHEET 5.

Witnesses:
Alexander Mitchell
James H. Catlow

James G. Hendrickson, Inventor
By Frederick S. Duncan, Atty

No. 733,038. PATENTED JULY 7, 1903.
J. G. HENDRICKSON.
LABELING MACHINE.
APPLICATION FILED DEC. 24, 1901.
NO MODEL. 6 SHEETS—SHEET 6.

Witnesses
Alexander Mitchell
James M. Barlow

James G. Hendrickson, Inventor
by Frederick S. Duncan, Atty

No. 733,038. Patented July 7, 1903.

UNITED STATES PATENT OFFICE.

JAMES G. HENDRICKSON, OF BAYONNE, NEW JERSEY, ASSIGNOR TO NEW YORK LABELLING MACHINE COMPANY, A CORPORATION OF NEW YORK.

LABELING-MACHINE.

SPECIFICATION forming part of Letters Patent No. 733,038, dated July 7, 1903.

Application filed December 24, 1901. Serial No. 87,096. (No model.)

*To all whom it may concern:*

Be it known that I, JAMES G. HENDRICKSON, a citizen of the United States, and a resident of Bayonne, in the county of Hudson and State of New Jersey, have invented certain new and useful Improvements in Labeling-Machines, of which the following is a specification, taken in connection with the accompanying drawings, which form part of the same.

This invention relates to labeling-machines of the type in which a series of articles are simultaneously and intermittently fed along a runway into coöperation with a series of intermittently-acting labeling devices mounted adjacent the runway.

In the accompanying drawings, in which the same reference characters indicate similar parts in the various figures.

In general terms the embodiment of this invention shown in the drawings comprises the frame upon the top of which is mounted a table to support the feeder mechanism. This feeder mechanism comprises a four-motion feed by which a series of articles are intermittently fed from station to station along the runway. Below the runway at the several stations are mounted, first, a paste apparatus; second, a label-box, and, third, a pressure device, which are intermittently operated to apply labels to the articles at the several stations. Above the runway there are mounted a series of retainers which are actuated to clamp the articles at the several stations upon the runway, so that these articles are held firmly while the label-applying devices are operating upon them.

Figure 3:
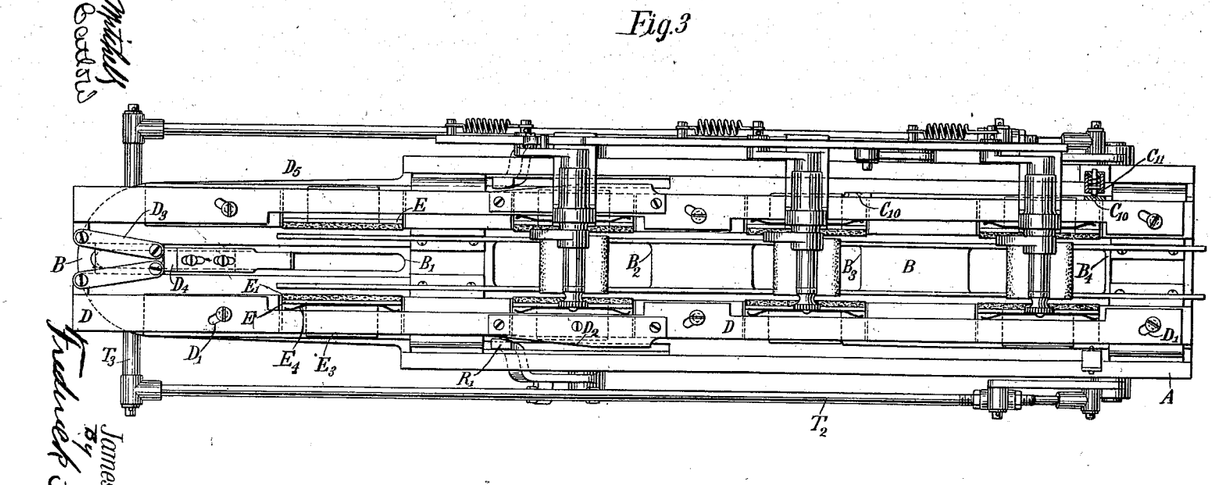
Fig. 3 is a plan view.
Figure 4:
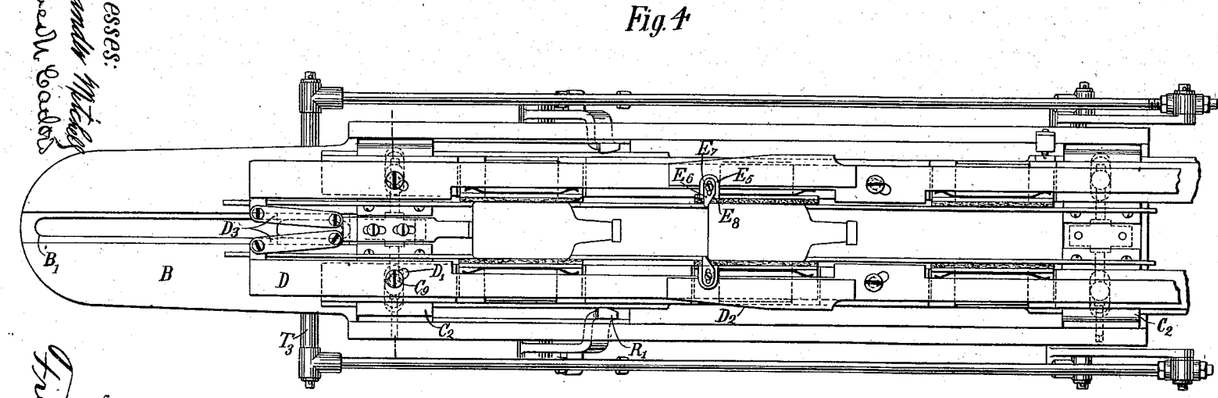
Figs. 4 and 5 are partial plan views.
Figure 6:
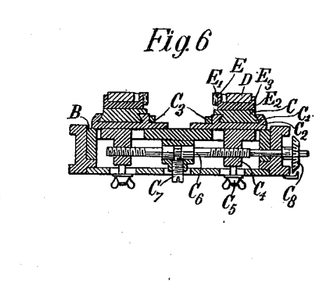
Fig. 6 is a transverse sectional view through the table and feeder mechanism.

*Feeder mechanism.*—The frame of the machine comprises side pieces A, which are rigidly connected together by a number of transverse members $A'$, $A^2$, and $A^3$. Upon the top of the side pieces the table B is rigidly secured. This table, as is indicated in Fig. 3, is formed with an elongated yoke-slot $B'$ at the rear end of the table and with a series of openings $B^2$, $B^3$, and $B^4$ to allow the labeling devices to move up into engagement with the articles at the several stations, which are equally spaced along the machine. At either end of this table the slide-guides $C^2$ are mounted. These guides are for the purpose of allowing the slides C to reciprocate longitudinally of the table. The extent of this reciprocation of the slides is exactly the distance between the stations along the runway. The construction of these parts is indicated in Fig. 6. The slide-guides $C^2$ are mounted so as to move transversely of the table and are clamped in any desired position by the wing-nuts $C^5$. These slide-guides are adjusted laterally by the adjusting-screw $C^6$, mounted in a suitable bearing in the table, the central groove in this screw being engaged by the screw $C^7$, so that the adjusting-screw is always maintained in proper position. The depending lugs on the lower portions of the slide-guides are formed with threaded openings $C^4$, with which the adjusting-screw engages, so that both slide-guides are symmetrically adjusted by the rotation of this right-and-left screw. Upon the outer end of the adjusting-screw is fastened the beveled dial-plate $C^8$, with which a suitable indicator coacts to indicate the position of the slide-guides. The guiding members $C^3$ are rigidly secured to these slide-guides and extend substantially throughout the length of the table to form a continuous runway. As will be seen, the articles to be labeled rest upon these guiding members as they are fed through the machine. The slides C are formed with the dovetail portions $C'$, which engage with similar recesses in the slide-guides, so that the slides are accurately guided in their longitudinal reciprocations on either side of the runway. These slides are formed near the front end of the same with the conical depression $C^{10}$ to be engaged by the conical-headed spring-latch $C^{11}$, so that when this latch comes into engagement with one of the depressions the slide is held stationary with sufficient force to prevent the accidental displacement of the same.

The slide-pins $C^9$ are mounted upon the slides at intervals along the same, and these pins serve to secure the feeder-bars D in position upon the slides, so that the feeder-bars may reciprocate to some extent upon the slides and also move transversely of the same as the slide-pins $C^9$ move in the inclined slots $D'$ in the feeder-bars. These slots are shown as straight and inclined with respect to the slides; but, if desired, any other suitable form of connection between the slides and feed-bars may be employed so long as a limited movement is allowed between the two. A series of grippers E are mounted to move transversely of the slides, since the body portion $E^2$ of each one of these grippers moves in transverse guideways in the slides. These grippers are provided with upwardly-extending lugs E and $E^3$ at either end of the same, so that the feeder-bars which move over the grippers engage these lugs and move the grippers transversely of the slides. As is indicated in the drawings, the springs $E^4$ are interposed between the feeder-bars and the face of the grippers, so that the grippers are pressed together with yielding action. The yieldable facings $E'$ of rubber or other suitable material are secured to the grippers, so that they engage the articles on the runway in a yielding manner.

Figure 5:
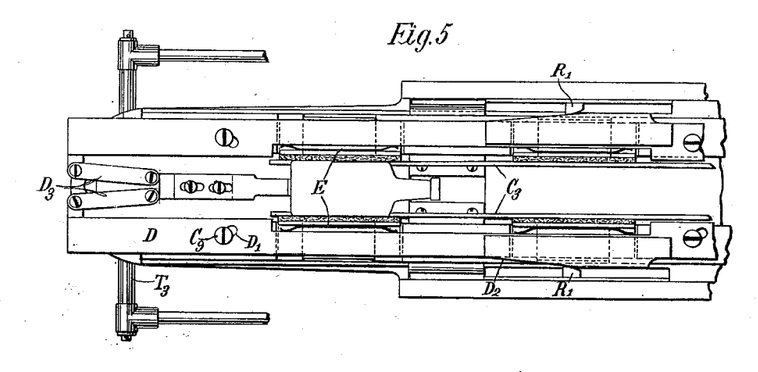

Each of the feeder-bars D is connected by means of short links $D^3$ with a yoke-piece $D^4$, secured to the yoke $T^3$, so that the feeder-bars are reciprocated in unison. Upon each one of the feeder-bars is secured the wedging-cam $D^2$, having the inclined cam-face indicated. These wedging-cams are engaged by the inclined portions of the levers $R'$, so that as these levers move forward they wedge the feeder-bars inward and assist in forcing the grippers together. Then assuming that the feeder mechanism is in the position indicated in Fig. 3 the feeder-bars first move upon the slide-pins, so as to cause the grippers to approach and grip articles on the runway, as indicated in Fig. 5. Then the feeder-bars, together with the slides, move along the runway, carrying the articles with them, since the force of the links $D^3$ is sufficient to disengage the depressions $C^{10}$ from the latches $G^{11}$. Then when the articles have been advanced to the next station the depressions $C^{10}$ at the rear of the slides come into engagement with the spring-latches, so that the slides are once more held in position. Upon the rearward movement of the yoke the feeder-bars move on the slide-pins to disengage the grippers from the articles, and thereupon the feeder-bars move, together with the slides, back to their original position, the grippers during this backward reciprocation being out of contact with the articles on the runway. This constitutes a four-motion feed, which has proved to be very successful in labeling-machines of this type.

Figure 1:
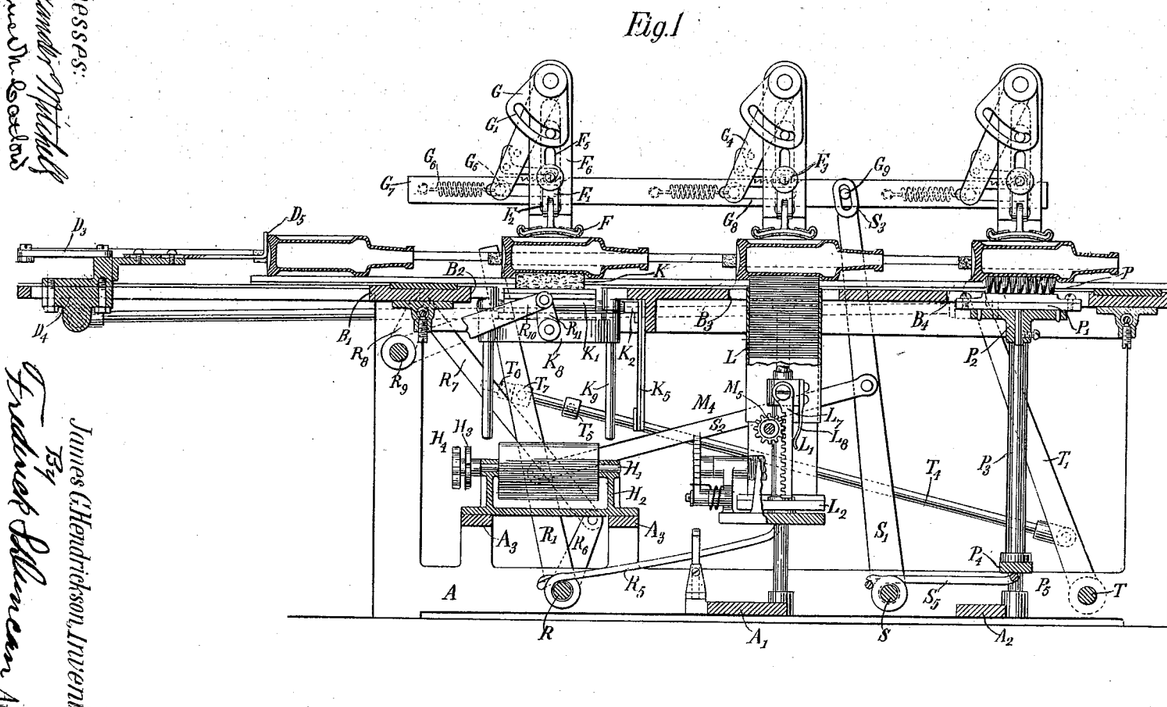
Figure 1 is a longitudinal sectional view of a labeling-machine embodying this invention.

As indicated in Fig. 1, the gage-piece $D^5$ is adjustably secured to the yoke member $D^4$, and this gage-piece secures the proper alinement of the rearmost article as it is placed upon the rear of the runway. Also, if desired, the alining members $E^6$ may be used upon the other grippers to secure the proper longitudinal position of the articles at the various stations. These alining members are plates formed with inclined forward faces $E^8$, projecting beyond the faces of the grippers into the runway, and these plates are adjustably secured upon the lugs $E^5$ on the grippers by the screws $E^7$, which pass through slots in these plates. As will be seen, when the grippers come together the inclined forward edges of these alining members will engage the rear of the articles on the runway and will crowd them forward slightly, so as to hold them accurately in the desired position with reference to the slides. These alining members may of course be secured upon all the grippers, if desired. As will be seen, the feeder mechanism may be very readily adjusted to accommodate articles of different sizes, since the slide-guides, together with the guiding members $C^3$, which support the articles, are adjusted laterally by the adjusting-screws at either end of the runway. These slide-guides also carry all the rest of the feeder mechanism, so that this single adjustment adapts the whole feeder mechanism for articles of various widths. Also by employing the indicators shown it is a very simple matter to secure the accurate parallelism of the runway by adjusting the two ends to the same width. The mechanism disclosed is also of great utility in this connection, since the runway is by this means always in proper alinement with the labeling devices which are permanently mounted below the same, since both sides of the runway are symmetrically moved out and in by the adjusting means shown.

If desired, the hinged faces $E^5$ may be pivoted to the grippers by the hinge-pins $E^6$. These faces are provided with yielding facing-strips $E'$, as has been described. The position of these hinged faces is adjusted by the adjusting-screws $E^7$ and $E^8$, acting in projecting lugs in the adjacent edges E and $E^5$, so as to rigidly hold the faces at the proper angle. These hinged faces may be adjusted to fit wedge-shaped articles along the runway, and it is desirable when this is done that one side of the article be substantially parallel to one side of the runway, so that the articles are more securely supported by the guiding members.

*Retainers.*—The retainer-supports $G^3$ are mounted upon the top of the machine, at one side of the same, so that they support the retainers F to coöperate properly with the runway at the several stations. The retainers are formed of a curved plate of metal or other suitable material, to which a facing of yieldable material is secured, if desired. These retainers are pivoted to the retainer-sleeves F' by the pivots $F^2$, so that the retainers are allowed free movement in this matter about the two perpendicular axes, the sleeves F' being freely movable about the studs $F^3$. These studs $F^3$ are clamped to the retainer-slides $F^6$ by securing the reduced rear ends of the studs $F^4$ in slots $F^5$ in the slides. The slides $F^6$ are mounted in the retainer-supports, so that they are allowed to move vertically in slots formed in the same under the influence of the retainer-cams G, the cam-slots G' in which coöperate with the suitable pin on the slide. The cams are rigidly secured to the pivots $G^3$, mounted in bearings at the top of the supports, and are actuated by the cam-arms $G^4$. The pins $G^5$ at the lower ends of these arms engage suitable slots $G^8$ in a retainer-bar $G^7$, which is reciprocated at the proper time by the lever S'. The pins $G^5$ are also connected to the retainer-bar by the spiral springs $G^6$, which tend to draw the pins to one end of the slots, as indicated. This movement tends to rotate each of the cams in such a direction as to force the corresponding retainer F down upon an article on the runway. It will thus be seen that when the retainers are actuated in unison by the retainer-bar the retainers are each brought into action with an article on the runway and hold the same down under the action of the retainer-springs $G^6$, since the retainer-studs should be adjusted in the slides so that the pins $G^5$ do not reach the end of the slots in the retainer-bar when the retainers clamp the articles upon the runway. The retainers are each actuated by spring-pressure in this manner, and they are thus enabled to compensate for the different sizes of articles fed along the runway, so as to effectually clamp every article in a satisfactoy manner. The universal-joint connection of each of the retainers with the retainer-slides furthermore allows each of the retainers to accommodate itself to the irregularities of shape of the article with which it coacts, so as to clamp the same more firmly upon the runway.

Figure 2:
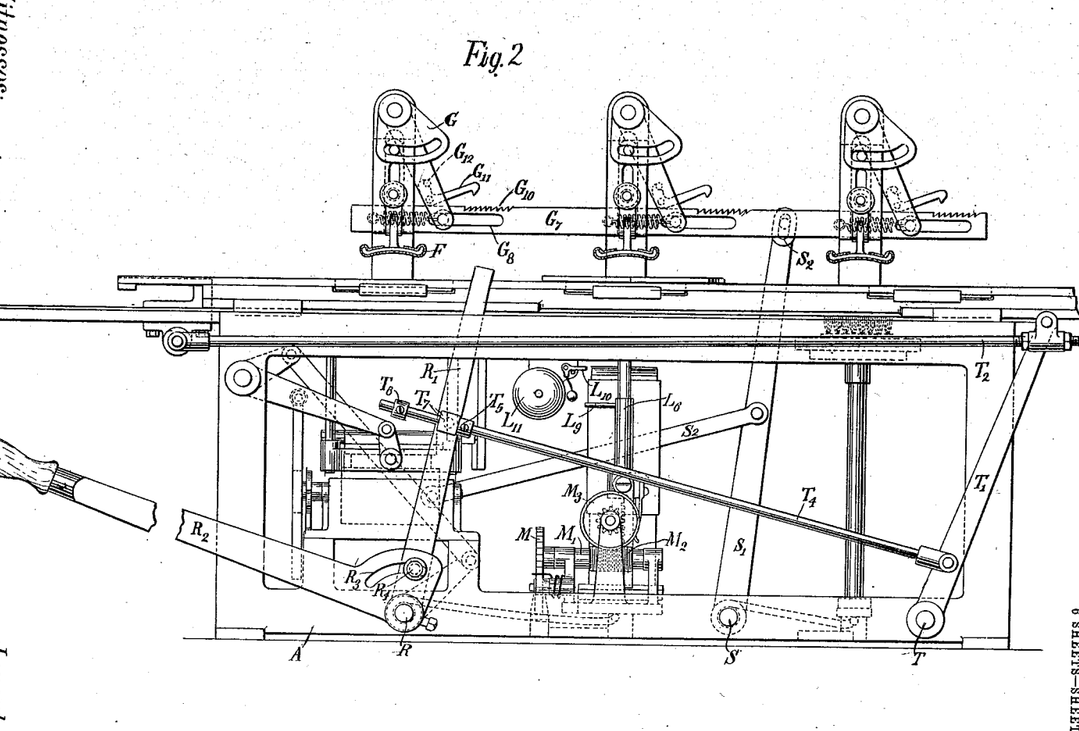
Fig. 2 is a longitudinal elevation of the same.

In order to more quickly release the retainers, a series of notches $G^{10}$ (indicated in Fig. 2) may be formed at intervals along the retainer-bar $G^7$. Latches $G^{11}$ are mounted on the cam-arms, so that they coact with these notches. The pivoted latches are disengaged from these notches when the retainers are fully released by means of the pins $G^{12}$ in the cam-arms. It will thus be seen that assuming the retainer mechanism to be in the position indicated in Fig. 1 a reciprocation of the retainer-bar toward the right of that figure in order to release the retainers would at once move the cams to raise the retainers, since the latches engage the notches on the retainer-bar and raise the retainers without allowing the springs $G^6$ to move the cam-arms $G^4$, so that the pins on the ends of these arms come into engagement with the ends of the slots $G^8$. Then after the retainers are entirely released the pins $G^{12}$ raise the latches from engagement with the notches $G^{10}$, as is shown in Fig. 2, so that the springs are free to draw the pins $G^5$ to the ends of the slots.

*Paster.*—The paster is mounted adjacent the runway to coöperate with the same at the first station, the paste-pad in the construction shown passing up through the opening $B^2$ in the table. The paste-reservoir $H^2$ is mounted upon the transverse members $A^3$ of the frame, and the paste-drum H, preferably of polygonal form, as indicated, is mounted upon a shaft H', which turns in bearings in the paste-reservoir. Rigidly secured to this shaft are the feeding-ratchet $H^4$ and the stop-wheel $H^3$, the stop-wheel being engaged by a suitable spring-latch shown to hold the paste-drum in proper position as it is fed around by the ratchet. This ratchet is engaged by a feeding-pawl $H^6$ upon a spring $H^5$, secured to a moving part of the machine, so that the paste-drum is thus intermittently fed around to present new paste-covered faces to the paste-pad. The doctor $H^7$ is pivoted to the side of the paste-reservoir and is provided with a scraping edge $H^9$, which serves to engage the paste-drum and distribute the paste evenly over the surface of the same. At either side of the doctor are the adjusting-screws $H^{10}$, their rounded ends in engagement with the paste-drum being substantially in line with the scraping edge of the doctor, so that the scraping edge is always held at the proper distance from the surface of the paste-drum by a spring $H^8$ in whatever position the doctor may engage the polygonal faces of the same.

Figure 8:
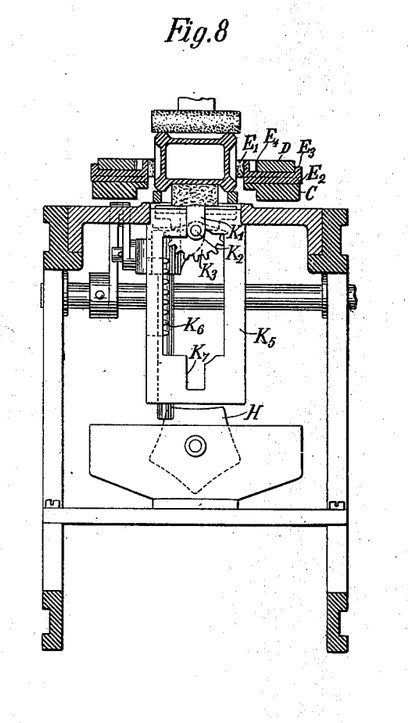
Fig. 8 is a transverse sectional view showing the paster.
Figure 9:
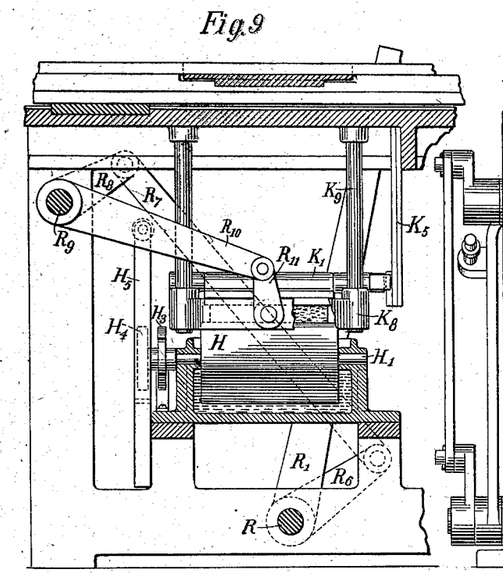
Fig. 9 is a partial longitudinal sectional view showing the paster.
Figure 10:
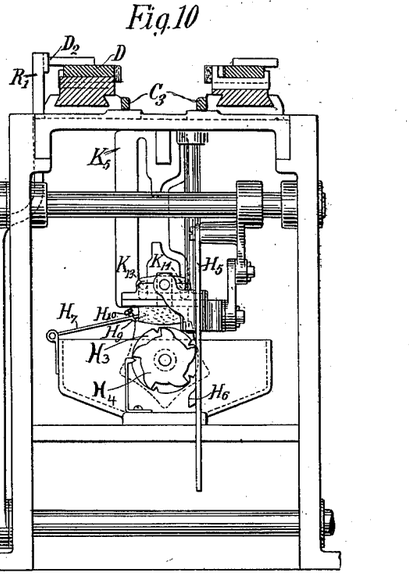
Fig. 10 is a transverse sectional view of the same.
Figures 11, 12, 13, 14, 16:
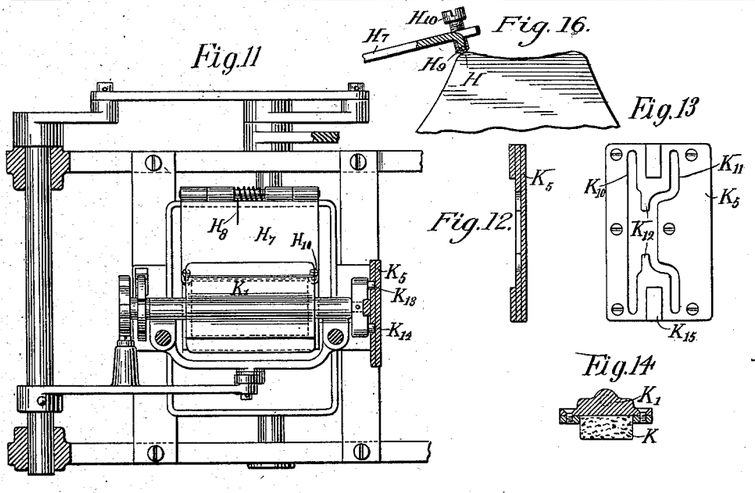
Fig. 11 is a plan view of the same.
Figs. 12, 13, and 14 show details of the paster.
Fig. 16 is a detail showing the paste drum and scraper.
Figure 15:
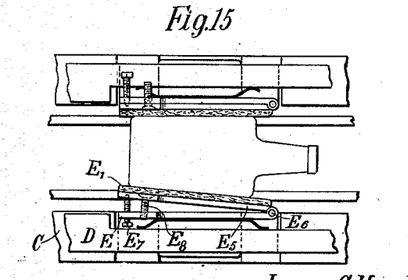
Fig. 15 is a partial plan view of the feeder mechanism.

The vertical guide-bars $K^9$ are secured to the table and guide the pad-support $K^8$ as it reciprocates vertically above the paste-drum. The pad-support is provided with bearings at either end, in which the paste-pad K' is revolubly mounted, the pad being rigidly secured to the short shaft $K^2$. Upon the end of this shaft is secured a reversing mechanism operating in connection with the cam-plate $K^5$, secured to the table of the machine. As indicated in Fig. 8, the cam-plate is provided with the guiding-slots $K^7$ at either end of the same, with which the guide-piece $K^4$ upon the shaft $K^2$ coacts. The mutilated gear $K^3$ is also secured to this shaft, and this gear coacts with the rack-section $K^6$ upon the cam-plate, so that as the pad-support moves downward from the position indicated in Fig. 8 the guiding member $K^4$ moves out of the cam-slot $K^7$, and then the teeth of the rack and gear engage to rotate the shaft $K^2$ through a half-revolution, so as to bring the pad in engagement with the paste-drum. Then as the pad-support is raised the reverse operation takes place, and the pad is oscillated through one hundred and eighty degrees as it is reciprocated and also is guided at either end of its reciprocation. If desired, the form of oscillating mechanism indicated in Figs. 9 to 13 may be employed, the shaft upon which the pad is mounted being provided with two pins $K^{13}$ and $K^{14}$, which engage the cam-slot K, formed in the cam-plate $K^5$. This cam-slot is formed of the straight portion $K^{10}$ and the inclined portion $K^{11}$ intersecting the same, the projections $K^{12}$ being formed, as indicated in Fig. 13, at the intersection of these slots. The two pins engage the two cam-slots, as is indicated in Fig. 10, and then as the pad-support is raised the pin $K^{14}$ is retarded after it moves out of the straight portion of the slot $K^{11}$, so that the pin $K^{13}$ is thrown over and enters the curved slot $K^{11}$, the pin $K^{14}$ of course traveling to the other side of the cam-opening and entering the straight cam-slot $K^{10}$. The reverse operation takes place upon the downward movement of the pad-support. The pad is accurately guided at either end of its reciprocation by the guiding-lugs $K^{15}$, formed on the cam-plate. In this way it will be seen that the desired amount of paste is taken up from the paste-drum by the pad and transferred to the article upon the runway at each reciprocation of the paste-pad, the paste-drum being fed around one step at a time to supply fresh paste from the paste-reservoir to the pad. The exact shape of the paste-drum is not material, and the faces of the drum may be formed concave, as shown, or straight, if desired.

Figure 7:
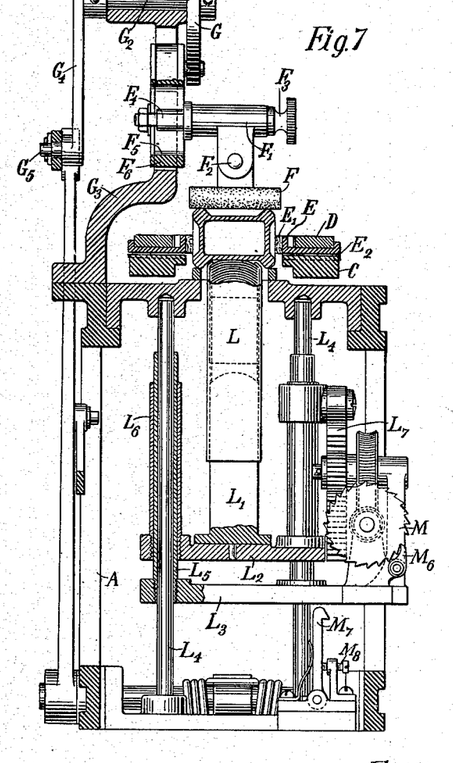
Fig. 7 is a transverse sectional view showing the label-box.

*Label-box.*—The label-box is mounted to coöperate with the runway at the station ahead of the paster, the label-box moving up through the opening $B^3$ in the table. As indicated in Fig. 7, the label-box is guided in its vertical reciprocations by the guide-rods $L^4$, rigidly mounted in the frame of the machine. The label-box L is of substantially rectangular construction, having the inwardly-projecting ribs at the top of the box to retain the top label in position by engaging its outer side, and the labels are pressed forward in this box by the plunger $L'$, having the curved top indicated, which serves to bend each of the labels and force them out of the label-box. The labels are inserted through an opening indicated in the farther side of the box as the box is shown in Fig. 7. The plunger is removably secured to the platform $L^2$, which is rigidly secured to the upwardly-extending tubes $L^6$, encircling the guide-rods $L^4$. The tubes $L^5$, to which the label-support $L^3$ is rigidly secured, pass within the tubes $L^6$, so that both the platform and label-support are accurately guided by the guide-rods $L^4$. The support is reciprocated vertically, and thus the label-box is moved vertically into engagement with the articles upon the runway.

In order to compensate for the removal of labels from the box during the operation of the machine, the platform is fed forward from the support at the same rate that the labels are removed from the label-box. The label-ratchet fast on the shaft $M'$ is revolubly mounted in bearings on the support and is engaged by the holding-pawl $M^6$. The worm $M^2$ is also fast on the shaft $M'$, and this shaft engages a worm-wheel $M^3$, which carries the label-pinion $M^5$. This pinion is engaged by the rack $L^7$, which is pivoted to one of the tubes $L^6$ on the label-platform, the rack being pressed against the pinion by the spring $L^8$. The feeding-pawl $M^7$ is pivoted to the frame of the machine and is spring-pressed into engagement with an adjusting-screw $M^8$, so that at each reciprocation of the label-support this feeding-pawl engages the ratchet M and feeds it around one or more teeth. This movement of the label-ratchet through the reducing-gear described raises the platform and plunger, so that at each reciprocation of the label-box one label is removed from the upper end of the box and applied to an article upon the runway, and at the same time the plunger is fed forward through a distance substantially equal to the thickness of this label. The distance therefore between the top label and the label-support is maintained substantially uniform throughout the operation of the machine, so that the labels are always applied to the articles upon the runway with substantially the same pressure. As the labels in the box become exhausted the pin $L^9$ upon the tube $L^6$ engages the latch $L^{10}$ during the reciprocation of the label-box, and the indicator-bell $L^{11}$ is rung when the labels in the box are nearly exhausted. The attention of the operator is thus called to the exhaustion of the labels, and the supply of labels may be replenished at the proper time.

*Presser-pad.*—After the labels have been applied to the pasted surfaces of the articles it is desirable that they be smoothly pressed down upon the articles, and for this purpose the reciprocating support $P^4$ is mounted at the station at the front end of the machine, the pressure-pad P operating through the opening $B^4$ in the table. The support $P^4$ is rigidly connected with the tubes $P^3$, guided upon the vertical rods $P^5$, and this support has rigidly secured to it the member $P^2$, to which the pressure-plate $P'$ is clamped by the means indicated. This pressure-pad P, which is secured to the support in this manner, is preferably formed of tufted bristles, having an accurately-formed upper surface, so that the label is smoothly pressed down upon the pasted article, and at the same time the paste cannot accumulate to any such extent on the upper surface of the pressure-pad as to withdraw the label from the article. If desired, however, any other form of pressure-pad may be employed.

*Operating mechanism.*—The shaft R is journaled in the frame of the machine near the rear end of the same and has rigidly secured to it in an adjustable manner the levers R'. The operating-handle R² is loosely mounted upon this shaft R, and the bolt R⁴ in the lever R' serves to clamp the handle in any desired position with respect to the lever, the bolt moving in the circular slot R³. The upper ends of these levers, as has been described, are formed with inclined cam portions to actuate the wedging-cams D², so that at the beginning of the forward movement of the feeder-bars these wedging-cams are engaged by the levers, and the feeder-bars are forced together by this means as well as by the force of the links D³. The spring R⁵ passes several times around the shaft R and is clamped to the same, the free end of this spring passing under the label-support to raise the label-box into engagement with the articles upon the runway. The shaft S is similarly mounted in the frame and carries the spring S⁵, secured to it in a similar manner. This spring actuates the pressure-pad. The lever S' is rigidly secured to the shaft S, and the link S² connects this lever with the lever R', so that the shafts S and R are oscillated in unison. The upper end of the lever S' is formed with the slot S³, so as to loosely engage the retainer-bar, the pin G⁹ in this bar passing through the slot S³.

The shaft T is mounted in the frame of the machine, and the levers T' on either side of the machine are rigidly secured to this shaft. The upper ends of these levers have pivoted to them the links T², which connect the feeder-yoke T³ with the levers T', the length of these links being adjustable by means of the set-nuts indicated, which engage the threaded ends of these links. The rod T⁴ on each side of the machine is pivoted to the lever T', and upon the rear end of this rod is adjustably secured the collars T⁶ on each side of the collar T⁷, through which this rod passes freely and which is pivoted to the lever R'. In this way considerable lost motion is permitted between the levers R' and the rods T⁴. The arm R⁶ is rigidly secured upon the shaft R and is connected by a link R⁷ with the bell-crank lever, moving about the pivot R⁹, the link being connected with the arm R⁸ of this lever, while the arm R¹⁰ of the lever is connected by a link R¹¹ with the pad-support K⁸ to reciprocate the same vertically.

Operation: In labeling articles by this machine the operator moves the handle R² up and down and at the same time feeds the articles one at a time into the rear end of the runway against the gage D⁵ when this part is in its rearward position. (Shown in Fig. 1.) Then as the operating-handle is moved upward the labeling devices are lowered out of engagement with the articles at the several stations along the runway, then the retainers are released from these articles, and finally the four-motion feed engages each one of the articles and feeds them forward simultaneously until the next station along the runway. Thereupon the retainers again engage them as the operating-handle is moved downward, and thereafter the labeling devices are raised to act upon the articles at the several stations to apply labels to them.

It will of course be understood by those familiar with this art that many changes may be made in the form of labeling-machine disclosed without departing from the spirit of this invention. Parts of this invention may, furthermore, be employed without using all of the same, and parts of this invention may be used in connection with other devices. I do not, therefore, wish to be limited by the disclosure which I have made in this case; but what I claim as new, and what I wish to secure by Letters Patent, is set forth in the appended claims.

What is claimed as new is—

1. In a labeling-machine, a frame having a table secured to the top of the same, guideways mounted on said table at either end of the same, slides mounted in said guideways and extending longitudinally of said table, lower guiding members secured to said guides extending longitudinally of said table to form a runway in connection with said slides, slide-pins in said slides, feeder-bars having angularly-arranged parallel slots mounted on said slides, said slide-pins engaging said slots, grippers mounted upon said slides to reciprocate transversely of the same, said grippers being provided with lugs which are engaged by said feeder-bars to cause said grippers to move transversely of said slides, a feeder-yoke, feeder-links connecting said feeder-yoke to said feeder-bars, labeling devices mounted below said runway at stations along the same, a series of retainers mounted in retainer-slides so as to be vertically movable to clamp articles upon said runway at said stations, means to actuate said retainers in unison to engage articles at said stations by spring-pressure, means to reciprocate said feeder-yoke to intermittently feed a series of articles from station to station along said runway and means to intermittently actuate said labeling devices to apply labels to said articles at said stations.

2. In a labeling-machine, a table, slide-guides mounted at either end of said table, means to laterally adjust said guides symmetrically about the central line of said table, slides mounted to move in said guides, lower guiding members secured to said guides to form in connection with said slides a runway extending longitudinally of said table, grippers mounted on said slides to move transversely of the same, feeder-bars mounted upon said slides by pin-and-slot connections to have longitudinal and transverse movement with respect to said slides, said feeder-bars engaging said grippers to move them transversely of said slides, labeling devices mounted to coöperate with said runway, means to intermittently clamp articles upon said runway in coöperation with said labeling devices and means to reciprocate said feeder-bars to cause said grippers to engage a series of articles to feed said articles simultaneously along said runway and to release said articles before said grippers are reciprocated in a rearward direction.

3. In a labeling-machine, a series of alined labeling devices, a runway comprising guiding members adjustably mounted, means to adjust said guiding members simultaneously so as to maintain said runway symmetrical with respect to said labeling devices, indicators on said adjusting means, slide-guides secured to said guiding members, slides mounted in said guides, feeder-bars mounted on said slides by a loose connection so as to move longitudinally and transversely of said slides, grippers connected with said feeder-bars to engage the sides of an article to be labeled, means to reciprocate said slides to cause said grippers to engage a series of articles to advance said articles simultaneously along said runway into engagement with said labeling devices to release said articles and to reciprocate in a rearward direction while out of contact with said articles.

4. In a labeling-machine, a series of alined labeling devices, means operating in conjunction with said labeling devices to hold articles while said labeling devices act upon the same, a runway comprising two longitudinal guiding members, slide-guides to which said guiding members are secured, means to simultaneously adjust the position of said slide-guides so as to adjust the width of said runway while maintaining the same symmetrical with respect to said labeling devices, slides mounted in said slide-guides, feeder-bars loosely mounted upon said slides to move longitudinally and transversely of said slides, a series of oppositely-arranged grippers connected with said slides and said feeder-bars, alining means to secure the alinement of articles longitudinally of said runway with respect to said feeder-bars and means to reciprocate said feeder-bars to cause said grippers to yieldingly engage a series of articles on said runway to simultaneously advance the same into engagement with said labeling devices, to release the same and to reciprocate rearward out of contact with said articles.

5. In a labeling-machine, a series of alined labeling devices, a runway comprising guiding members adjustably mounted, means to adjust said guiding members simultaneously so as to maintain said runway symmetrical with respect to said labeling devices, indicators on said adjusting means, means to feed a series of articles simultaneously along said runway and means to hold said articles upon said runway to coöperate with said labeling devices.

6. In a feeder for a labeling-machine, a table, slide-guides mounted at either end of said table, longitudinal guiding members secured to said guides to form a runway, means to symmetrically adjust the slide-guides on either side of said runway to adjust the width of said runway and to maintain said runway symmetrical about the central line of the same in adjusted position, slides mounted in said guides, grippers mounted to slide transversely in said slides, feeder-bars having loose connection with said slides to move longitudinally and transversely of the same, said grippers having a yielding connection with said feeder-bars, alining means connected with said feeder-bars to secure the longitudinal alinement of articles fed along said runway and means to reciprocate said feeder-bars to cause said grippers to yieldingly engage a series of articles to simultaneously advance said articles along said runway and to maintain the longitudinal alinement of the same to release said articles and to reciprocate rearward out of contact with said articles.

7. In a feeder for labeling-machines, a runway, slides mounted to reciprocate adjacent said runway, feeder-bars loosely mounted upon said slides to move longitudinally and transversely of the same, grippers mounted upon said slides to reciprocate transversely of the same, said grippers being yieldingly connected with said feeder-bars to be moved by said feeder-bars transversely of said slides and means to reciprocate said feeder-bars to secure a four-motion feed for feeding articles along said runway by moving said grippers into yielding contact with said articles, by advancing said articles simultaneously along said runway, by releasing said articles and by reciprocating rearward out of contact with said articles.

8. In a feeder for a labeling-machine, a runway, a series of grippers and means yieldingly connected with said grippers to constitute in connection with the same a four-motion feed to intermittently feed a series of articles simultaneously along said runway.

9. In a feeder for a labeling-machine, a runway, a series of yielding-faced grippers and means connected with said grippers to constitute in connection with the same a four-motion feed to intermittently and simultaneously feed a series of articles along said runway.

10. In a labeling-machine, a runway, a labeling device mounted adjacent said runway, means mounted on the opposite side of said runway from said labeling device to hold an article in coöperation with said labeling device, grippers and means constituting with said grippers a four-motion feed to engage articles on the sides of the same and simultaneously feed said articles along said runway into coöperation with said labeling device.

11. In a labeling-machine, a series of labeling devices intermittently operating to apply labels to articles and a positively-gripping four-motion feed to intermittently and simultaneously feed a series of articles into successive engagement with said labeling devices.

12. In a labeling-machine, a runway, labeling devices to coöperate with said runway, a gripper and means to cause said gripper to press against the side of an article on said runway to advance along said runway while in engagement with said article to feed the same to release said article and to reciprocate rearward while out of contact with said article.

13. In a labeling-machine, a runway, an intermittently-operating labeling device mounted adjacent said runway, a retainer-support mounted adjacent said runway, a retainer-slide mounted to move in said support to and from said runway, a stud adjustably mounted in said slide, a retainer having a universal-joint connection with said stud, a retainer-cam pivoted in said support to reciprocate said slide in said support, means to rotate said cam and a feeder to feed articles along said runway under said retainer.

14. In a labeling-machine, a runway, an intermittently-operating labeling device mounted to coöperate with said runway, a retainer-support mounted on the opposite side of said runway from said labeling device to coöperate therewith, a retainer-slide mounted in said support, a retainer-cam to reciprocate said slide, means to operate said cam and a retainer adjustably connected with said slide by a universal joint.

15. In a labeling-machine, a runway, a series of labeling devices mounted adjacent said runway to coöperate therewith, a series of retainer-supports, cams mounted in each of said supports, retainers adjustably connected with said cams to be operated thereby, a retainer-bar, means to reciprocate the same, a loose connection between said retainer-bar and each of said cams, said connection including springs and a feeder to intermittently feed a series of articles along said runway to coöperate with said labeling devices.

16. In a labeling-machine, a runway, a series of intermittently-operating labeling devices mounted adjacent said runway to coöperate therewith, retainer-supports mounted adjacent said runway, cams in said supports, retainers movably mounted in said supports and operated by said cams, a retainer-bar, means to reciprocate said retainer-bar, cam-arms to operate said cams loosely connected with said retainer-bar, springs between said arms and said retainer-bar, notches in said retainer-bar, latches pivoted upon said arms to engage said notches, pins on said arms to disengage said latches from said notches and a feeder to intermittently feed a series of articles along said runway into engagement with said labeling devices.

17. In a labeling-machine, a runway, a series of labeling devices mounted adjacent said runway to coöperate therewith, retainer-supports mounted adjacent said runway, retainers movably mounted in said supports to coöperate with said runway, means to simultaneously actuate said retainers to clamp articles upon said runway to cause said retainers to exert substantially the same pressure upon each of said articles, and a feeder to intermittently feed a series of articles along said runway.

18. In a labeling-machine, labeling means including a paste-reservoir, a paste-drum, a paste-pad, a pad-support in which said pad is revolubly mounted, means to reciprocate said support and means to oscillate said pad during the reciprocation of said support to bring said pad into contact with the substantially horizontal face of said paste-drum and to bring said pad into contact with an article to be labeled.

19. In a labeling-machine, labeling means including a paste-reservoir, a paste-drum movably mounted in said reservoir, a paste-pad, a reciprocating pad-support in which said pad is movably mounted, means to reciprocate said pad and a gear and rack to oscillate said pad during its reciprocation.

20. In a labeling-machine, labeling means including a paste-reservoir, a polygonal paste-drum revolubly mounted in said reservoir, a spring-pressed doctor acting upon said paste-drum and an adjusting-screw coöperating with said paste-drum secured to said doctor in line with the scraping edge of the same.

21. In a labeling-machine, a runway, means to feed articles to be labeled along said runway, a paste apparatus, a label-box and a pressure-pad coöperating with said runway, said pressure-pad comprising a brush of tufted bristles to act upon a labeled article.

22. In a labeling-machine, a runway, labeling devices mounted adjacent said runway to coöperate with the same, means to hold articles in position upon said runway adjacent said labeling devices, grippers, said grippers being provided with hinged faces, means to adjust the position of said hinged faces and means to give said grippers a four-motion feed to intermittently feed a series of articles simultaneously along said runway.

23. In a labeling-machine, a runway, labeling devices mounted adjacent said runway to coöperate with the same, grippers provided with adjustable faces and means to give said grippers a four-motion feed to intermittently feed a series of articles simultaneously along said runway.

24. In a labeling-machine, a runway, labeling devices mounted adjacent said runway to coöperate with the same, grippers having hinged faces to adjust the same to articles on said runway and means to give said grippers a four-motion feed to intermittently feed a series of articles simultaneously along said runway.

25. In a labeling-machine, a runway, labeling devices mounted adjacent said runway to coöperate with the same, grippers having angularly-adjustable faces and means to operate said grippers to feed articles along said runway.

26. In a labeling-machine, a runway, labeling devices mounted adjacent said runway to coöperate with the same, grippers to feed articles along said runway, said grippers being provided with angularly-adjustable hinged faces to engage the sides of tapering articles on said runway.

27. In a labeling-machine, labeling means including a paste-reservoir, a polygonal paste-drum revolubly mounted in said reservoir, a movable doctor acting upon said drum and having adjusting means in line with the scraping edge of said doctor to engage said drum.

28. In a labeling-machine, a polygonal paste-drum, a movable doctor coöperating with said paste-drum and adjusting means on said doctor in line with the scraping edge of the same to coöperate with said drum.

29. In a labeling-machine, a pressure-pad having a flat operating-surface comprising a brush of tufted bristles and means to press said pressure-pad upon a label to cause said label to adhere to an article.

30. In a labeling-machine, a runway, a series of labeling devices mounted adjacent said runway to coöperate therewith, retainer-supports mounted adjacent said runway, retainers mounted by universal joints in said supports to coöperate with said runway, means to simultaneously actuate said retainers to clamp articles upon said runway and a feeder to intermittently feed a series of articles along said runway.

31. In a labeling-machine, a runway, labeling devices coacting with said runway, retainer-supports mounted adjacent said runway, retainers mounted by universal joints in said supports to coöperate with said runway, means to simultaneously actuate said retainers to clamp articles upon said runway to cause said retainers to exert substantially the same pressure upon each of said articles and a feeder to intermittently feed a series of articles along said runway.

32. In a labeling-machine, a runway, labeling devices mounted adjacent said runway, a retainer-support mounted adjacent said runway, a retainer movably mounted in said support, means to operate said retainer comprising a loose connection and a spring to press said retainer against an article with spring-pressure and a latch to prevent the operation of said spring as said retainer is withdrawn from said article.

33. In a labeling-machine, a runway, labeling devices mounted adjacent said runway, retainers movably mounted adjacent said runway, means to simultaneously operate said retainers and loosely connected therewith, said means pressing said retainers under spring action against articles on said runway and means to prevent the operation of said springs as said retainers are withdrawn from said articles.

34. In a labeling-machine, a pressure-pad comprising a brush of tufted bristles and means to reciprocate said pad perpendicularly against a labeled article to press the label upon said article.

JAMES G. HENDRICKSON.

Witnesses:
HARRY L. DUNCAN,
JAMES N. CATLOW.